(12) United States Patent
Chan

(10) Patent No.: US 12,081,132 B2
(45) Date of Patent: Sep. 3, 2024

(54) POWER SUPPLY DEVICE WITH HIGH EFFICIENCY

(71) Applicant: Acer Incorporated, New Taipei (TW)

(72) Inventor: Tzu-Tseng Chan, New Taipei (TW)

(73) Assignee: ACER INCORPORATED, New Taipei (TW)

(*) Notice: Subject to any disclaimer, the term of this patent is extended or adjusted under 35 U.S.C. 154(b) by 208 days.

(21) Appl. No.: 17/938,398

(22) Filed: Oct. 6, 2022

(65) Prior Publication Data
US 2024/0022175 A1    Jan. 18, 2024

(30) Foreign Application Priority Data
Jul. 18, 2022   (TW) .................................. 111126795

(51) Int. Cl.
*H02M 3/335*   (2006.01)
*H02M 1/00*    (2006.01)

(52) U.S. Cl.
CPC ..... *H02M 3/33569* (2013.01); *H02M 1/0058* (2021.05)

(58) Field of Classification Search
CPC . H02M 3/33569; H02M 1/0058; H02M 3/335
See application file for complete search history.

(56) References Cited

U.S. PATENT DOCUMENTS

| 11,336,191 | B1 * | 5/2022 | Chan | ...................... H02M 1/088 |
| 11,777,404 | B1 * | 10/2023 | Chan | ................... H02M 1/4225 |
| | | | | 363/16 |
| 2021/0126522 | A1 | 4/2021 | Preindl et al. | |
| 2023/0318466 | A1 * | 10/2023 | Chan | ................. H02M 3/33553 |

FOREIGN PATENT DOCUMENTS

| TW | 201935834 A | 9/2019 |
| TW | 202133537 A | 9/2021 |
| TW | 202215764 A | 4/2022 |

OTHER PUBLICATIONS

Chinese language office action dated Mar. 10, 2023, issued in application No. TW 111126795.

* cited by examiner

*Primary Examiner* — Adolf D Berhane
(74) *Attorney, Agent, or Firm* — McClure, Qualey & Rodack, LLP

(57) ABSTRACT

A power supply device with a high efficiency includes a switch circuit, a transformer, a first capacitor, an output stage circuit, and a PWM (Pulse Width Modulation) IC (Integrated Circuit). The switch circuit generates a switching voltage according to an input voltage, a first PWM voltage, and a second PWM voltage. The transformer includes a main coil, a first secondary coil, and a second secondary coil. A leakage inductor and a magnetizing inductor are built into the transformer. The main coil receives the switching voltage through the leakage inductor. The output stage circuit is coupled to the first secondary coil and the second secondary coil, and is configured to generate an output voltage and an output current. The PWM IC selectively adjusts the switching frequency and duty cycle of the first PWM voltage according to the output current.

15 Claims, 4 Drawing Sheets

POWER SUPPLY DEVICE WITH HIGH EFFICIENCY

CROSS REFERENCE TO RELATED APPLICATIONS

This application claims priority of Taiwan Patent Application No. 111126795 filed on Jul. 18, 2022, the entirety of which is incorporated by reference herein.

BACKGROUND OF THE INVENTION

Field of the Invention

The disclosure generally relates to a power supply device, and more specifically, to a power supply device with high efficiency.

Description of the Related Art

In conventional power supply devices, when an output diode switches from a turned-on state into a turned-off state, an output current flowing through the output diode may not be reduced to 0. This non-ideal characteristic tends to increase the switching loss of the power supply device, thereby reducing the overall efficiency of the power supply device. Accordingly, there is a need to propose a novel solution for solving this problem of the prior art.

BRIEF SUMMARY OF THE INVENTION

In a preferred embodiment, the invention is directed to a power supply device with a high efficiency, and it includes a switch circuit, a transformer, a first capacitor, an output stage circuit, and a PWM (Pulse Width Modulation) IC (Integrated Circuit). The switch circuit generates a switching voltage according to an input voltage, a first PWM voltage, and a second PWM voltage. The transformer includes a main coil, a first secondary coil, and a second secondary coil. A leakage inductor and a magnetizing inductor are built into the transformer. The main coil receives the switching voltage through the leakage inductor. The first capacitor is coupled to the magnetizing inductor. The output stage circuit is coupled to the first secondary coil and the second secondary coil, and is configured to generate an output voltage and an output current. The PWM IC generates the first PWM voltage and the second PWM voltage. The PWM IC selectively adjusts the switching frequency and the duty cycle of the first PWM voltage according to the output current.

In some embodiments, the switch circuit includes a first transistor and a second transistor. The first transistor has a control terminal for receiving the first PWM voltage, a first terminal coupled to a first node for outputting the switching voltage, and a second terminal coupled to an input node for receiving the input voltage. The second transistor has a control terminal for receiving the second PWM voltage, a first terminal coupled to a ground voltage, and a second terminal coupled to the first node.

In some embodiments, the leakage inductor has a first terminal coupled to the first node for receiving the switching voltage, and a second terminal coupled to a second node. The main coil has a first terminal coupled to the second node, and a second terminal coupled to a third node. The magnetizing inductor has a first terminal coupled to the second node, and a second terminal coupled to the third node. The first capacitor has a first terminal coupled to the third node, and a second terminal coupled to the ground voltage. The first secondary coil has a first terminal coupled to a fourth node, and a second terminal coupled to a common node. The second secondary coil has a first terminal coupled to the common node, and a second terminal coupled to a fifth node.

In some embodiments, the output stage circuit includes a first diode, a second diode, and a second capacitor. The first diode has an anode coupled to the fourth node, and a cathode coupled to an output node for outputting the output voltage. The second diode has an anode coupled to the fifth node, and a cathode coupled to the output node. The second capacitor has a first terminal coupled to the output node, and a second terminal coupled to a detection node.

In some embodiments, the output stage circuit further includes a sensing resistor. The sensing resistor has a first terminal coupled to the detection node, and a second terminal coupled to the common node. The output current flows through the first diode, the second capacitor, and the sensing resistor, such that the sensing resistor outputs a detection voltage at the detection node.

In some embodiments, the PWM IC continuously monitors the detection voltage, so as to obtain the maximum value of the detection voltage.

In some embodiments, the PWM IC obtains the instant value of the detection voltage at the falling edge of the first PWM voltage.

In some embodiments, the PWM IC calculates the adjustment ratio by dividing the instant value by the maximum value.

In some embodiments, if the adjustment ratio is not equal to 0, the PWM IC will decrease the switching frequency of the first PWM voltage according to the adjustment ratio.

In some embodiments, if the adjustment ratio is not equal to 0, the PWM IC will increase the duty cycle of the first PWM voltage according to the adjustment ratio.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
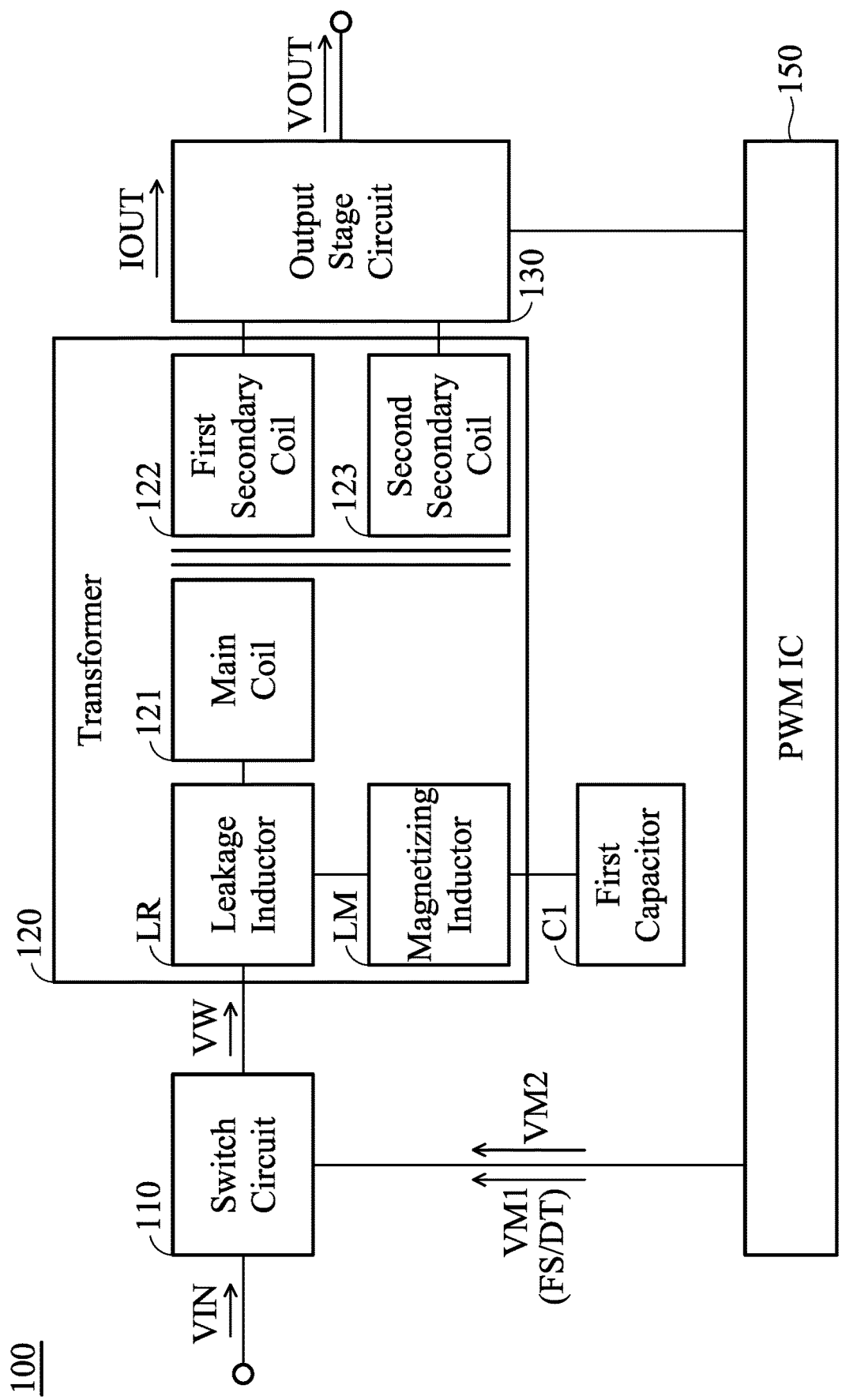
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes a switch circuit 110, a transformer 120, a first capacitor C1, an output stage circuit 130, and a PWM (Pulse Width Modulation) IC (Integrated Circuit) 150. It should be noted that the power supply device 100 may further include other components, such as a voltage regulator and/or a negative feedback circuit, although they are not displayed in FIG. 1.

The switch circuit 110 generates a switching voltage VW according to an input voltage VIN, a first PWM voltage VM1, and a second PWM voltage VM2. For example, the input voltage VIN may be a DC (Direct Current) voltage with a voltage level from 360V to 440V, but it is not limited thereto. The transformer 120 includes a main coil 121, a first secondary coil 122, and a second secondary coil 123. A leakage inductor LR and a magnetizing inductor LM are built in the transformer 120. The leakage inductor LR, the magnetizing inductor LM, and the main coil 121 may be positioned at the same side of the transformer 120. The first secondary coil 122 and the second secondary coil 123 may be positioned at the opposite side of the transformer 120. The main coil 121 receives the switching voltage VW through the leakage inductor LR. The first secondary coil 122 and the second secondary coil 123 can be operated according to the switching voltage VW. The first capacitor C1 is coupled to the magnetizing inductor LM. In some embodiments, a resonant tank of the power supply device 100 is formed by the leakage inductor LR, the magnetizing inductor LM, and the first capacitor C1. The output stage circuit 130 is coupled to the first secondary coil 122 and the second secondary coil 123, and is configured to generate an output voltage VOUT and an output current IOUT. For example, the output voltage VOUT may be another DC voltage with a voltage level from 18V to 20V, but it is not limited thereto. The PWM IC 150 generates the first PWM voltage VM1 and the second PWM voltage VM2. In a preferred embodiment, the PWM IC 150 can selectively adjust a switching frequency FS and a duty cycle DT of the first PWM voltage VM1 according to the output current IOUT. With such a design, the power supply device 100 can determine whether to achieve an ideal ZCS (Zero-Current Switching) operation by analyzing the output current IOUT. If not, the power supply device 100 can perform a self-calibration process, thereby effectively reducing the switching loss and enhancing the whole operational efficiency.

The following embodiments will introduce the detailed structure and operation of the power supply device 100. It should be understood these figures and descriptions are merely exemplary, rather than limitations of the invention.

Figure 2:
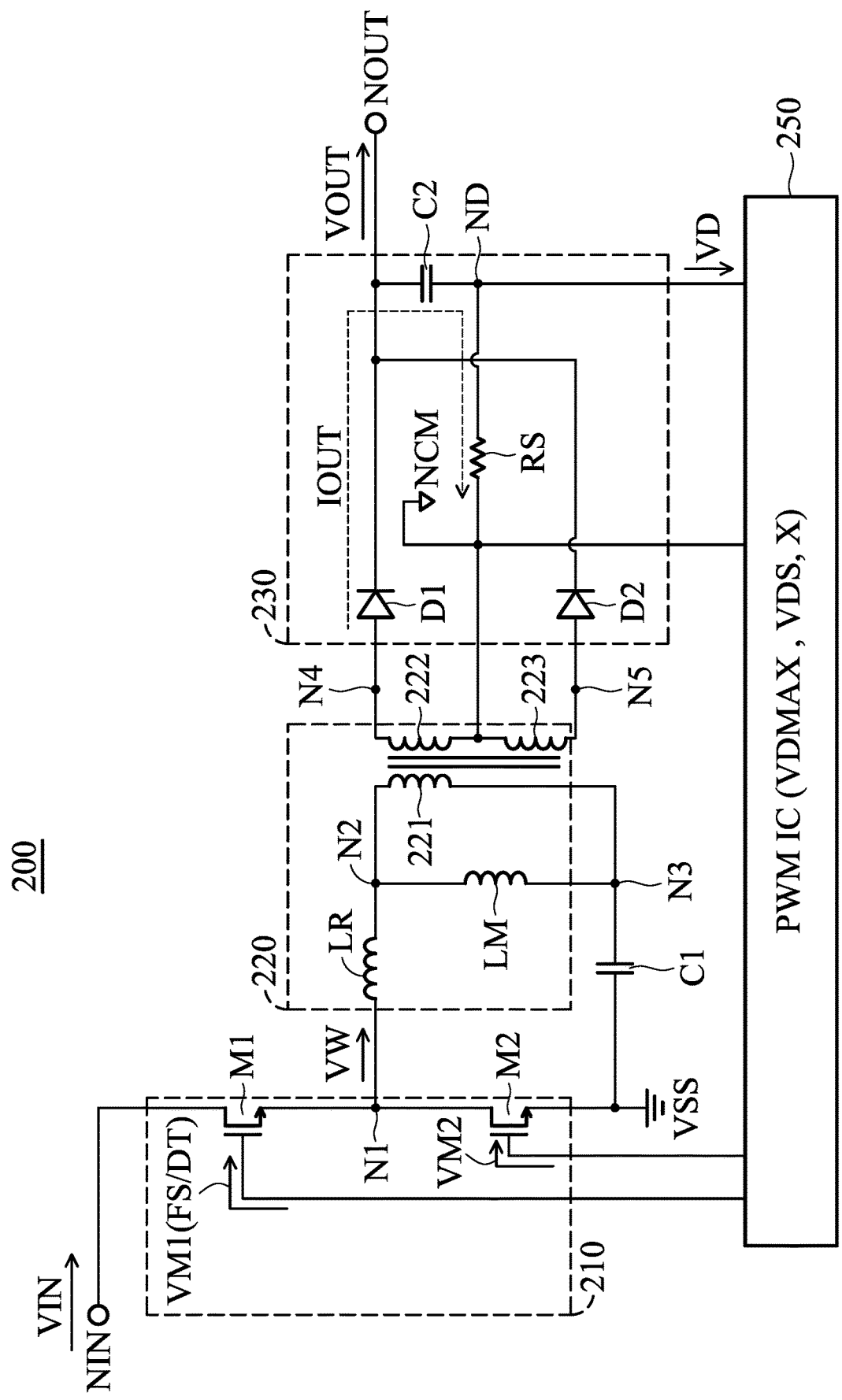
FIG. 2 is a diagram of circuitry of a power supply device according to an embodiment of the invention.

FIG. 2 is a diagram of circuitry of a power supply device 200 according to an embodiment of the invention. In the embodiment of FIG. 2, the power supply device 200 with an input node NIN and an output node NOUT includes a switch circuit 210, a transformer 220, a first capacitor C1, an output stage circuit 230, and a PWM IC 250. The input node NIN of the power supply device 200 is arranged for receiving an input voltage VIN from an external input power source (not shown). The output node NOUT of the power supply device 200 is arranged for outputting an output voltage VOUT to an electronic device (not shown).

The switch circuit 210 includes a first transistor M1 and a second transistor M2. For example, each of the first transistor M1 and the second transistor M2 may be an NMOSFET (N-type Metal Oxide Semiconductor Field Effect Transistor). The first transistor M1 has a control terminal (e.g., a gate) for receiving a first PWM voltage VM1, a first terminal (e.g., a source) coupled to a first node N1 for outputting a switching voltage VW, and a second terminal (e.g., a drain) coupled to the input node NIN. The second transistor M2 has a control terminal (e.g., a gate) for receiving the second PWM voltage VM2, a first terminal (e.g., a source) coupled to a ground voltage VSS (e.g., 0V), and a second terminal (e.g., a drain) coupled to the first node N1. In some embodiments, the first PWM voltage VM1 and the second PWM voltage VM2 have the same switching frequency FS and complementary logic levels.

The transformer 220 includes a main coil 221, a first secondary coil 222, and a second secondary coil 223. A leakage inductor LR and a magnetizing inductor LM are built into the transformer 220. The leakage inductor LR and the magnetizing inductor LM are inherent elements, which are generated when the transformer 220 is manufactured, and they are not external independent elements. The leakage inductor LR, the main coil 221, and the magnetizing inductor LM may be positioned at the same side of the transformer 220 (e.g., a primary side). The first secondary coil 222 and the second secondary coil 223 may be positioned at the opposite side of the transformer 220 (e.g., a secondary side, which may be isolated from the primary side). The leakage inductor LR has a first terminal coupled to the first node N1 for receiving the switching voltage VW, and a second terminal coupled to a second node N2. The main coil 221 has a first terminal coupled to the second node N2, and a second terminal coupled to a third node N3. The magnetizing inductor LM has a first terminal coupled to the second node N2, and a second terminal coupled to the third node N3. The first capacitor C1 has a first terminal coupled to the third node N3, and a second terminal coupled to the ground voltage VSS. In some embodiments, a resonant tank of the power supply device 200 is formed by the leakage inductor LR, the magnetizing inductor LM, and the first capacitor C1. The first secondary coil 222 has a first terminal coupled to a fourth node N4, and a second terminal coupled to a common node NCM. For example, the common node NCM may be considered as another ground voltage, which may be the same as or different from the aforementioned ground voltage VSS. The second secondary coil 223 has a first terminal coupled to the common node NCM, and a second terminal coupled to a fifth node N5.

The output stage circuit 230 includes a first diode D1, a second diode D2, a second capacitor C2, and a sensing resistor RS. The first diode D1 has an anode coupled to the fourth node N4, and a cathode coupled to the output node NOUT. The second diode D2 has an anode coupled to the fifth node N5, and a cathode coupled to the output node NOUT. The second capacitor C2 has a first terminal coupled to the output node NOUT, and a second terminal coupled to a detection node ND. The sensing resistor RS can provide a relatively low resistance (e.g., smaller than or equal to 5Ω). The sensing resistor RS has a first terminal coupled to the detection node ND, and a second terminal coupled to the common node NCM. It should be noted that a output current LOUT of the output stage circuit 230 flows through the first diode D1, the second capacitor C2, and the sensing resistor RS, such that the sensing resistor RS outputs a detection voltage VD at the detection node ND.

According to Ohm's Law, the voltage level of the detection voltage VD is substantially proportional to the current magnitude of the output current IOUT. Thus, the PWM IC 250 can obtain the relative information of the output current LOUT by analyzing the detection voltage VD. Next, the PWM IC 250 can selectively perform a self-calibration process according to the detection voltage VD.

Figure 3:
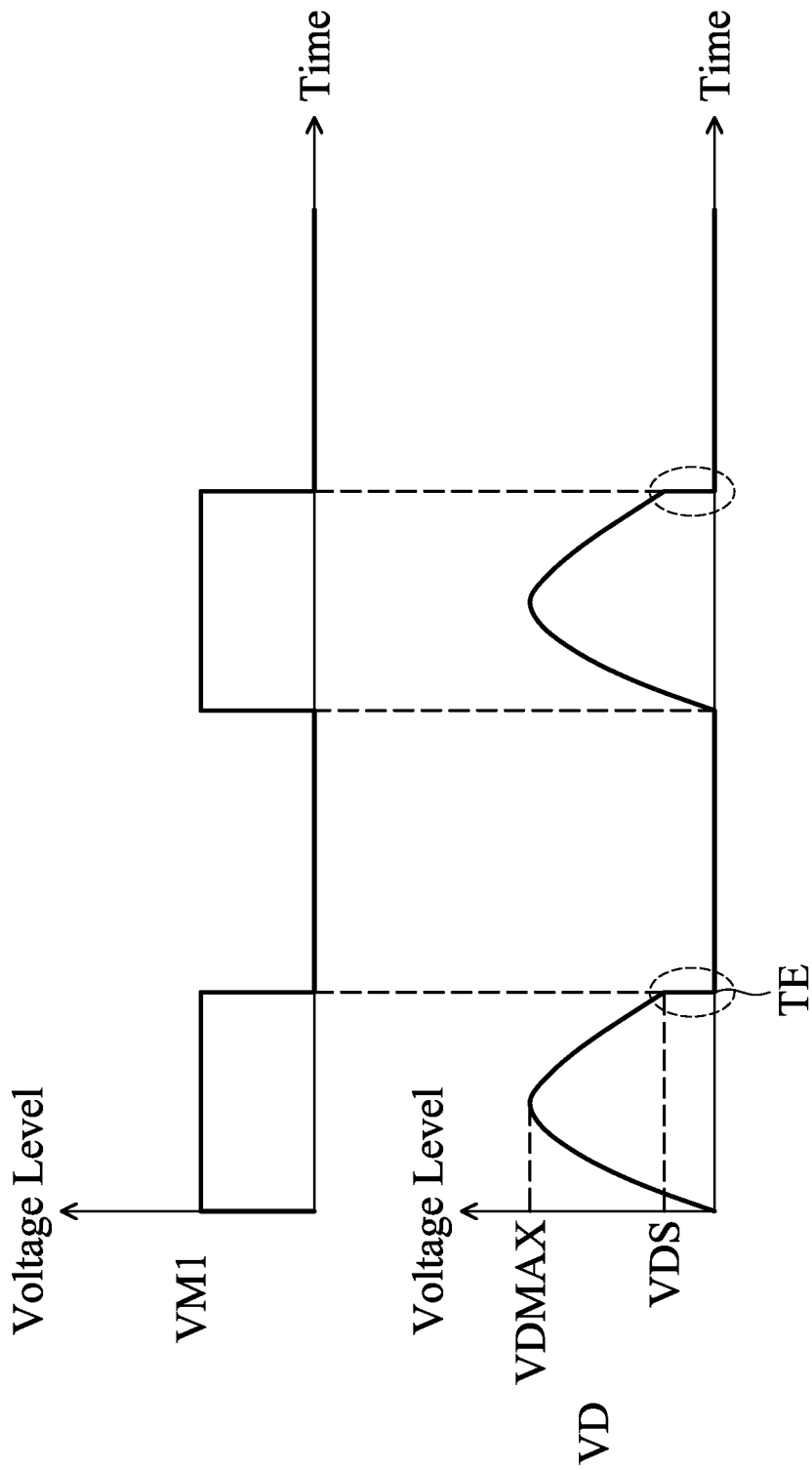
FIG. 3 is a diagram of signaling waveforms of a power supply device before a self-calibration process is performed, according to an embodiment of the invention.

FIG. 3 is a diagram of signaling waveforms of the power supply device 200 before the self-calibration process is performed, according to an embodiment of the invention. The horizontal axis represents the time, and the vertical axis represents the voltage level. In the embodiment of FIG. 3, the PWM IC 250 can continuously monitor the detection voltage VD, so as to obtain the maximum value VDMAX of the detection voltage VD. In addition, the PWM IC 250 can obtain the instant value VDS of the detection voltage VD at the falling edge of the first PWM voltage VM1. For example, if the first PWM voltage VM1 is switched from a high logic level to a low logic level at a specific time point TE, the PWM IC 250 can also measure the instant value VDS of the detection voltage VD at the specific time point TE. Then, the PWM IC 250 can calculate the adjustment ratio X by dividing the instant value VDS by the maximum value VDMAX. Specifically, the adjustment ratio X may be described as the following equations (1) and (2):

$$X = \frac{VDS}{VDMAX} \quad (1)$$

$$0 \leq X \leq 1 \quad (2)$$

If the adjustment ratio X is exactly equal to 0, it will represent that the output current IOUT is also exactly equal to 0 at the falling edge of the first PWM voltage VM1. In other words, the power supply device 200 has already achieved the ideal ZCS operation. Thus, the PWM IC 250 will maintain the switching frequency FS and the duty cycle DT of the first PWM voltage VM1.

Conversely, if the adjustment ratio X is not equal to 0, it will represent that the output current IOUT is also not equal to 0 at the falling edge of the first PWM voltage VM1. In other words, the power supply device 200 has not achieved the ideal ZCS operation. Thus, the PWM IC 250 will perform a self-calibration process, so as to update and optimize the switching frequency FS and the duty cycle DT of the first PWM voltage VM1. In some embodiments, the PWM IC 250 can decrease the switching frequency FS of the first PWM voltage VM1 according to the adjustment ratio X. For example, the PWM IC 250 may multiply the original switching frequency FS by the adjustment ratio X, but it is not limited thereto. In some embodiments, the PWM IC 250 can increase the duty cycle DT of the first PWM voltage VM1 according to the adjustment ratio X. For example, the PWM IC 250 may divide the original duty cycle DT by the adjustment ratio X, but it is not limited thereto. According to practical measurements, the aforementioned self-calibration process can help to increase the voltage gin of the power supply device 200 and ensure that the energy stored in the resonant tank is completely released.

Figure 4:
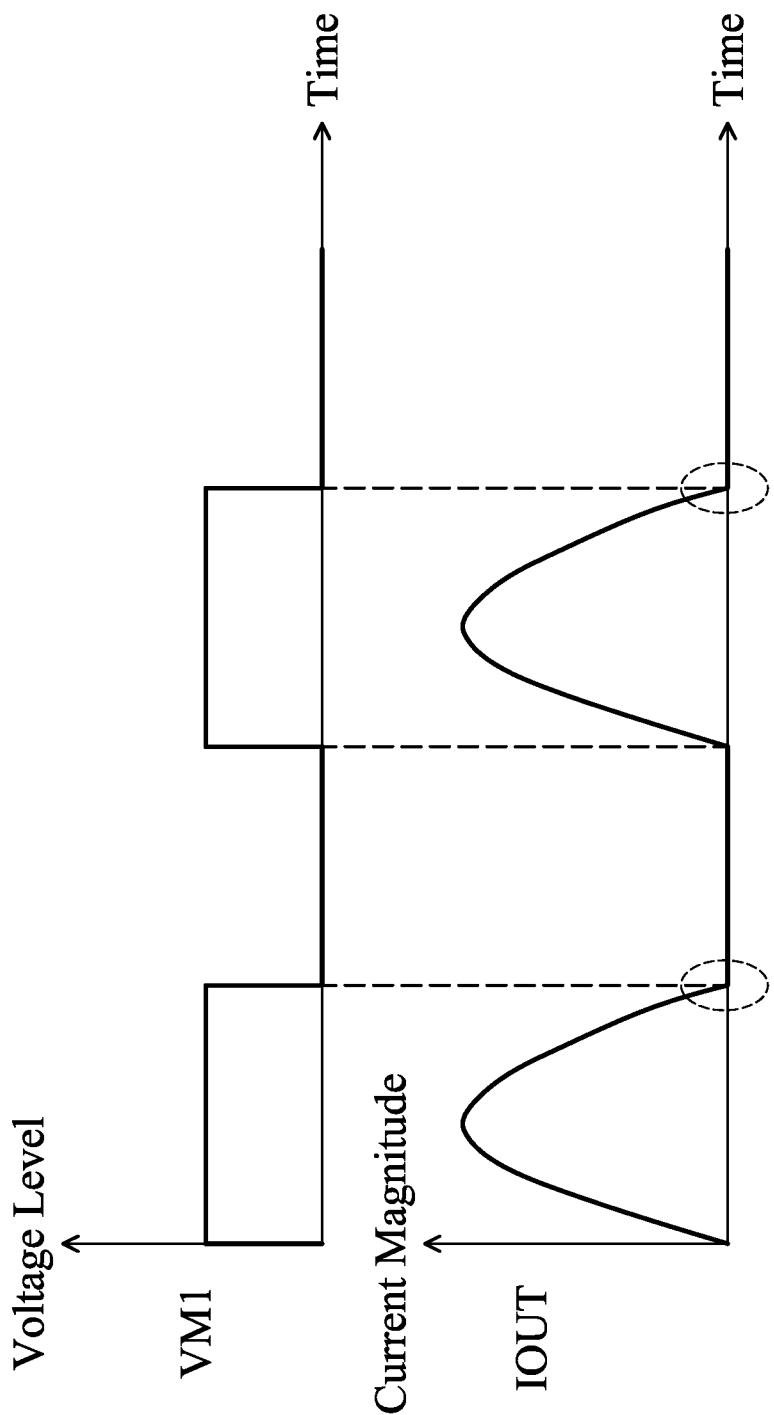
FIG. 4 is a diagram of signaling waveforms of a power supply device after a self-calibration process is performed, according to an embodiment of the invention.

FIG. 4 is a diagram of signaling waveforms of the power supply device 200 after the self-calibration process is performed, according to an embodiment of the invention. The horizontal axis represents the time, and the vertical axis represents the voltage level or the current magnitude. According to the measurement of FIG. 4, the aforementioned self-calibration process guarantees that the power supply device 200 can recover to the ideal ZCS operation, regardless of the initial settings.

The invention proposes a novel power supply device for significantly reducing the switching loss. According to practical measurements, the power supply device using the aforementioned design can effectively improve the whole operational efficiency, and therefore it is suitable for application in a variety of devices.

Note that the above voltages, currents, resistances, inductances, capacitances and other element parameters are not limitations of the invention. A designer can adjust these settings according to different requirements. The power supply device of the invention is not limited to the configurations of FIGS. 1-4. The invention may merely include any one or more features of any one or more embodiments of FIGS. 1-4. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device with high efficiency, comprising:
a switch circuit, generating a switching voltage according to an input voltage, a first PWM (Pulse Width Modulation) voltage, and a second PWM voltage;
a transformer, comprising a main coil, a first secondary coil, and a second secondary coil, wherein a leakage inductor and a magnetizing inductor are built in the transformer, and the main coil receives the switching voltage through the leakage inductor;
a first capacitor, coupled to the magnetizing inductor:
an output stage circuit, coupled to the first secondary coil and the second secondary coil, and generating an output voltage and an output current; and
a PWM IC (Integrated Circuit), generating the first PWM voltage and the second PWM voltage;
wherein the PWM IC selectively adjusts a switching frequency and a duty cycle of the first PWM voltage according to the output current.

2. The power supply device as claimed in claim 1, wherein the switch circuit comprises:
a first transistor, wherein the first transistor has a control terminal for receiving the first PWM voltage, a first terminal coupled to a first node for outputting the switching voltage, and a second terminal coupled to an input node for receiving the input voltage; and a second transistor, wherein the second transistor has a control terminal for receiving the second PWM voltage, a first terminal coupled to a ground voltage, and a second terminal coupled to the first node.

3. The power supply device as claimed in claim 2, wherein the leakage inductor has a first terminal coupled to the first node for receiving the switching voltage, and a second terminal coupled to a second node.

4. The power supply device as claimed in claim 3, wherein the main coil has a first terminal coupled to the second node, and a second terminal coupled to a third node.

5. The power supply device as claimed in claim 4, wherein the magnetizing inductor has a first terminal coupled to the second node, and a second terminal coupled to the third node.

6. The power supply device as claimed in claim 5, wherein the first capacitor has a first terminal coupled to the third node, and a second terminal coupled to the ground voltage.

7. The power supply device as claimed in claim 6, wherein the first secondary coil has a first terminal coupled to a fourth node, and a second terminal coupled to a common node.

8. The power supply device as claimed in claim 7, wherein the second secondary coil has a first terminal coupled to the common node, and a second terminal coupled to a fifth node.

9. The power supply device as claimed in claim 8, wherein the output stage circuit comprises:

a first diode, wherein the first diode has an anode coupled to the fourth node, and a cathode coupled to an output node for outputting the output voltage;

a second diode, wherein the second diode has an anode coupled to the fifth node, and a cathode coupled to the output node; and a second capacitor, wherein the second capacitor has a first terminal coupled to the output node, and a second terminal coupled to a detection node.

10. The power supply device as claimed in claim 9, wherein the output stage circuit further comprises:

a sensing resistor, wherein the sensing resistor has a first terminal coupled to the detection node, and a second terminal coupled to the common node;

wherein the output current flows through the first diode, the second capacitor, and the sensing resistor, such that the sensing resistor outputs a detection voltage at the detection node.

11. The power supply device as claimed in claim 10, wherein the PWM IC continuously monitors the detection voltage, so as to obtain a maximum value of the detection voltage.

12. The power supply device as claimed in claim 11, wherein the PWM IC obtains an instant value of the detection voltage at a falling edge of the first PWM voltage.

13. The power supply device as claimed in claim 12, wherein the PWM IC calculates an adjustment ratio by dividing the instant value by the maximum value.

14. The power supply device as claimed in claim 13, wherein if the adjustment ratio is not equal to 0, the PWM IC decreases the switching frequency of the first PWM voltage according to the adjustment ratio.

15. The power supply device as claimed in claim 13, wherein if the adjustment ratio is not equal to 0, the PWM IC increases the duty cycle of the first PWM voltage according to the adjustment ratio.

* * * * *